Patented Sept. 13, 1927.

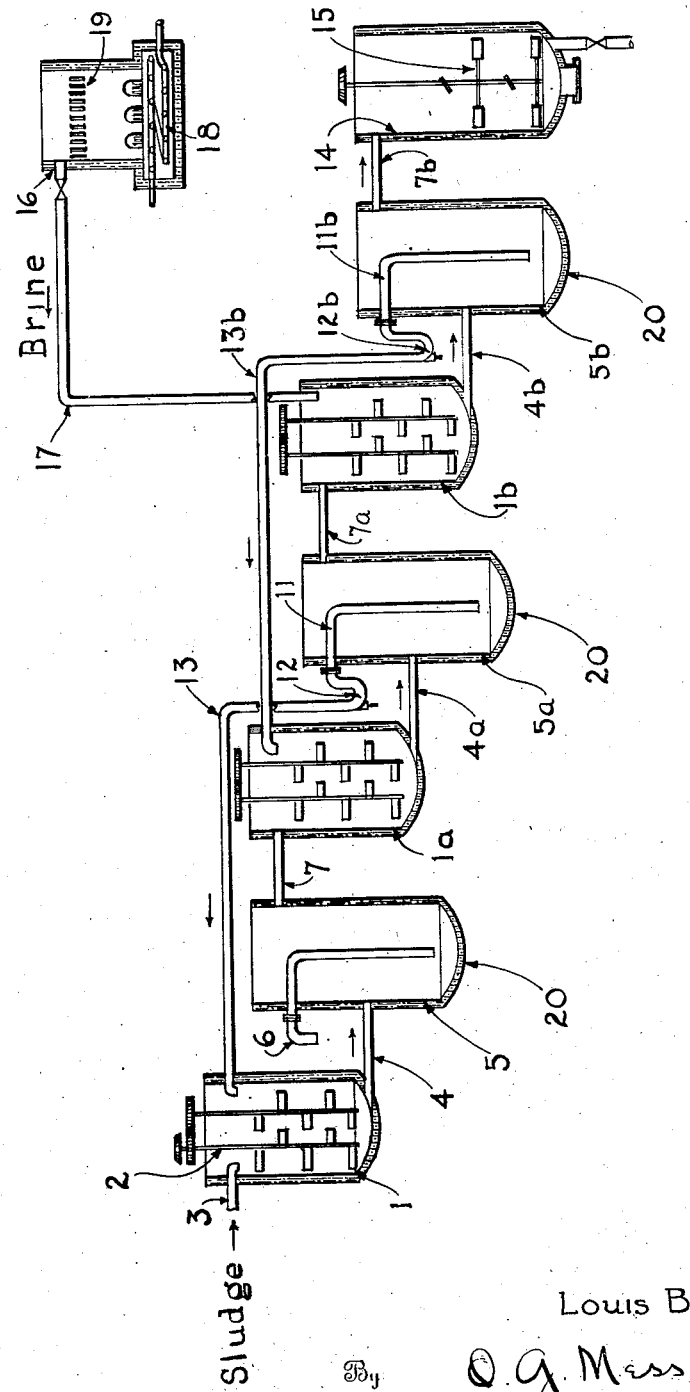

1,642,060

UNITED STATES PATENT OFFICE.

LOUIS BURGESS, OF BAYONNE, NEW JERSEY, ASSIGNOR TO STANDARD DEVELOPMENT COMPANY, OF NEW YORK, N. Y., A CORPORATION OF DELAWARE.

ART OF OBTAINING PRODUCTS FROM SLUDGE.

Application filed December 22, 1922. Serial No. 608,441.

This invention relates to the art of working up sludge which results from the treating of hydrocarbon oils with strong sulfuric acid. The invention will be fully understood from the following description, taken in connection with the accompanying drawing which represents semi-diagrammatically a form of apparatus contemplated.

In the drawing, the reference character 1 designates a receptacle provided with stirring means, as blades on shafts 2, the shafts being driven by gearing or other desired drive. A pipe 3 supplies sludge and an outlet 4 connects with a separating tank 5 which has one overflow 6 which extends up from the lower part of the tank and another overflow 7 from the top. Further agitators or stirring receptacles $1^a$, $1^b$, as many as desired, and similar to receptacle 1 are provided on in series, and alternating with them separating tanks $5^a$, $5^b$, the overflow 7 from tank 5 leading to receptacle $1^a$, and the outlet $4^a$ from the receptacle $1^a$ connecting with tank $5^a$, and so on. The overflow 11 from the lower portion of tank $5^a$ leads to a steam lift 12, and a pipe 13 which extends back to receptacle 1, and the overflow $11^b$ from the lower portion of tank $5^b$ leads to a steam lift $12^b$ and a pipe $13^b$ which extends back to receptacle $1^a$. The overflow $7^b$ from the last tank $5^b$ of the series leads to a neutralizer mixer 14 having suitable stirring arms 15 on a driven shaft.

The sludge to be treated, for example the sludge resulting from the action of fuming sulfuric acid on lubricating stocks, is fed by pipe 3 into the stirring receptacle 1 while a stream of sodium chloride solution is provided in about equal proportion. The sludge is stirred up with the salt solution and the mixture feeds through connection 4 to the tank 5 where a separation occurs, the sludge rising and floating as a top layer. The salt solution overflows from below through pipe 6 to the sewer, and the sludge overflows through connection 7 on to the next receptacle $1^a$ where it is again stirred up with salt solution and is then passed to tank $5^a$ to separate. The salt solution again overflows from below through pipe 11 and is forwarded by the steam lift 12 to the receptacle 1. The sludge flows over by connection $7^a$ to the next receptacle $1^b$ where it is again stirred up with salt solution and is then in turn passed to the next tank $5^b$ to separate. The salt solution overflowing by pipe $11^b$ is forwarded by steam lift $12^b$ to receptacle $1^a$ and the sludge overflows at connection $7^b$. As many successive mixings with salt solution followed by separation are carried out as the sludge handled may require. Ordinarily three such treatments are desirable.

In starting up the system, the flow of salt solution is turned in first, so as to be passed back through the system to receptacle 1 by the time the flow of sludge is turned on. The salt solution enters the system at the last stirrer by pipe 17 from the supply tank 16 and is supplied hot, the bottom of the tank containing a steam coil 18. A grid 19 in the tank serves to support a supply of rock salt to maintain the concentration desired. The steam lifts $12^b$ and 12 operate also to hold up the temperature of the brine, and heat insulation 20 is applied throughout the system. A temperature above 120° F. is maintained; in the tanks 5 etc. particularly a temperature of 125° F., or preferably 150° F., up to boiling being important, and it is desirable that the salt solution coming from the brine supply tank be saturated. The treatment with the salt solution removes surfuric acid and other undesirable materials from the sludge, so that by the time it leaves the last separator tank at $7^b$ it is a mass of almost pure organic compounds. In the mixer 14 the mass is neutralized, for example with powdered slacked lime or powdered sodium carbonate, and is then drawn off for storage or use. If desired, the product may be dried down further, for convenient handling.

While I have described my invention by reference to certain specific details, it will be understood that these are illustrative rather than limitative, and the invention is to be regarded as limited only as defined in the following claim, in which it is my intention to claim all inherent novelty as broadly as the prior art permits.

What I claim is—

Apparatus for treating acid sludge and the like, comprising two agitators, means for supplying sludge to the first agitator, a separator receiving effluent from the first agitator and discharging into the second agitator, a second separator receiving effluent from the second agitator, means for supplying a treating solution to the second agitator, and a steam lift for conveying treating solution from the second separator to the first agitator for preliminary treatment of the sludge entering the system, and for maintaining the temperature of the solution.

LOUIS BURGESS.